United States Patent [19]

Maas et al.

[11] 4,051,500
[45] Sept. 27, 1977

[54] PHOTOGRAPHIC CAMERA WITH A TIME-DELAY MECHANISM

[75] Inventors: Dieter Maas, Poring; Gerda Linke, Munich, both of Germany

[73] Assignee: AGFA-Gevaert Aktiengesellschaft, Leverkusen, Germany

[21] Appl. No.: 628,822

[22] Filed: Nov. 4, 1975

[30] Foreign Application Priority Data

Nov. 16, 1974 Germany .................. 2454509

[51] Int. Cl.[2] .................................. G03B 9/64
[52] U.S. Cl. .................................. 354/239
[58] Field of Search .............. 354/237, 275, 226, 238, 354/239, 240

[56] References Cited

U.S. PATENT DOCUMENTS

| | | | |
|---|---|---|---|
| 703,893 | 7/1902 | Bruck | 354/239 |
| 2,619,171 | 11/1952 | Goldhammer | 354/239 |
| 2,880,798 | 4/1959 | Lohmeyer | 354/237 X |
| 3,194,140 | 7/1965 | Winkler et al. | 354/239 |
| 3,276,344 | 10/1966 | Rentschiler | 354/239 |
| 3,955,209 | 5/1976 | Akiyama | 354/237 X |

*Primary Examiner*—Donald A. Griffin

*Attorney, Agent, or Firm*—Michael J. Striker

[57] ABSTRACT

A photographic camera has a shutter and a shutter setting and releasing mechanism which includes an operating member which moves in a predetermined path and direction when released. The camera further includes a time-delay mechanism for the shutter which is arrested by an arresting member when the latter is in its resting position. A coupling element selectively pivots between two positions in one of which it is located outside the path of movement of the operating member while in the other position it engages both the operating member and the arresting member. The coupling component is also mounted for movement in the direction of movement of the operating member when in engagement therewith so that it displaces the arresting member out of the arresting position whereby the time-delay mechanism is released. In a predetermined period of time, the time-delay mechanism activates a sliding member which moves the coupling component out of engagement with the operating member whereby the latter is freed to perform its movement in the aforementioned direction during which the shutter is operated. The camera can be used with or without utilizing the time-delay feature thereof.

6 Claims, 1 Drawing Figure

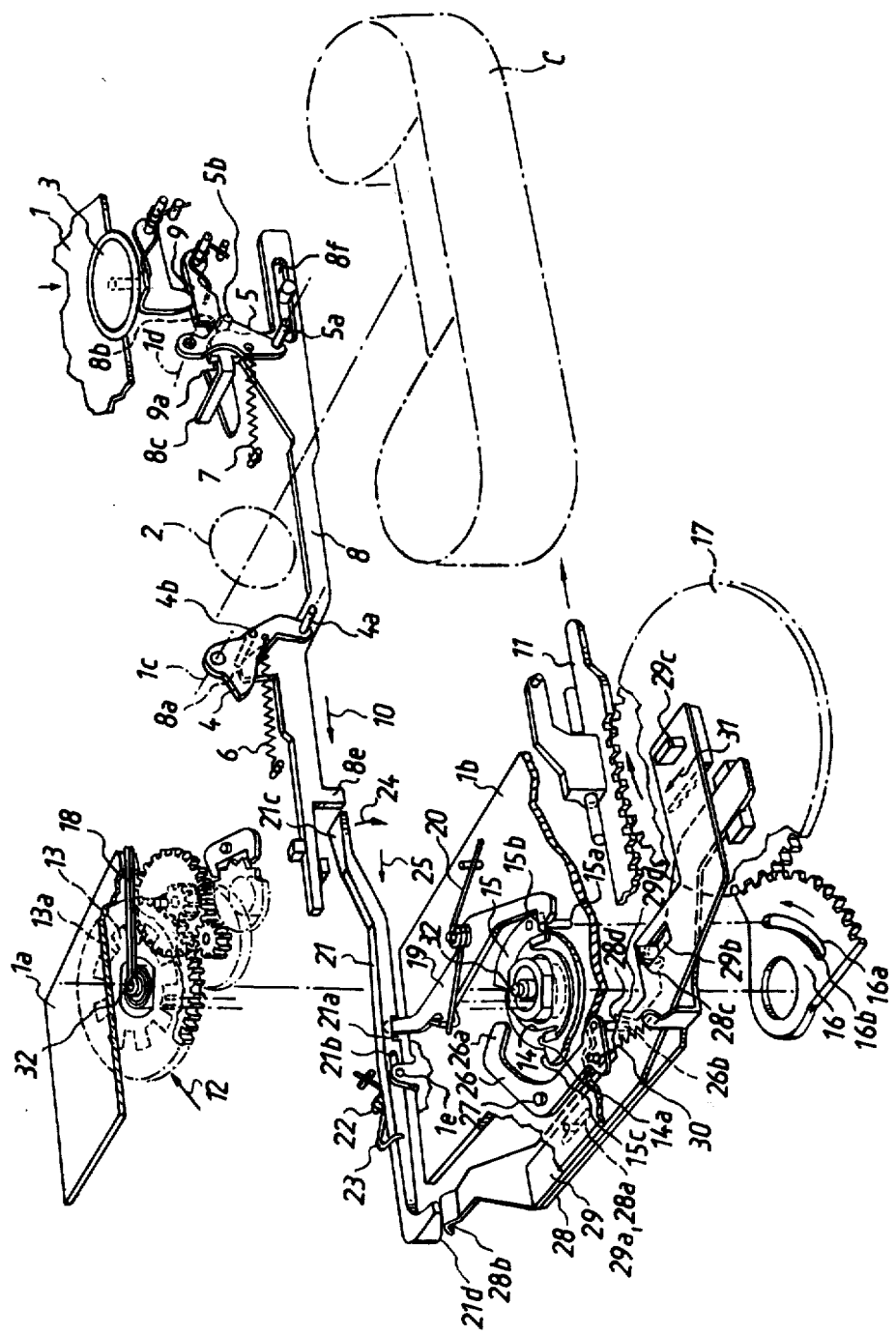

PHOTOGRAPHIC CAMERA WITH A TIME-DELAY MECHANISM

BACKGROUND OF THE INVENTION

The present invention relates to a photographic camera, and more particularly to such a camera which incorporates a time-delay mechanism for delaying the operation of a shutter by a certain time period after depression of the release button.

There are already known various constructions of photographic apparatus, some of which incorporate time-delay mechanisms which postpone the time at which the shutter is operated after the activation of the release button of the camera. Such cameras are rather complicated, bulky and expensive, particularly owing to the fact that the arrangement in these cameras which permits selective utilization of the time-delay feature take up a considerable amount of space. Thus, the heretofore known arrangements for coupling the shutter operating mechanism with the time-delay mechanism are not suited for use in small-size cameras, such as so-called pocket cameras.

SUMMARY OF THE INVENTION

Accordingly, it is a general object of the present invention to avoid the disadvantages of the prior art.

More particularly, it is an object of the present invention to provide a coupling arrangement between the shutter operating mechanism and the time-delay mechanism which is simple in construction and reliable in operation.

It is a further object of the present invention to devise a time-delay mechanism and a coupling mechanism which is suited for use in a small-size camera.

It is a concomitant object of the present invention to provide a coupling mechanism which takes up only a minimum amount of space.

It is still another object of the present invention to provide a time-delay mechanism and a coupling mechanism which can be incorporated into already existing constructions of cameras.

In pursuance of these objects and others which will become apparent hereafter, one feature of the present invention resides, briefly stated, in a photographic camera of the type having a shutter and a shutter setting and releasing mechanism including an operating member which moves in a predetermined path and direction when released, in a combination which comprises a time-delay mechanism for the shutter and an arresting member which is operative for arresting the time-delay mechanism when in an arresting position thereof. The camera further comprises a coupling component which has one portion adapted to engage the arresting member and another portion which is adapted for selective cooperation with the operating member of the shutter setting and releasing mechanism, the coupling component being mounted in the camera for pivoting between a first position in which the other portion is located outside the path of movement of the operating member, and a second position in which the other portion extends into the path to thereby limit the extent of movement of the operating member, and in which the one portion of the coupling component engages the arresting member associated with the time-delay mechanism. The coupling component is also mounted in the camera for displacement together with the operating member of the shutter setting and releasing mechanism in the direction of movement of the latter when in said second position so that the one portion of the coupling component displaces the arresting member associated with the time-delay mechanism out of the arresting position thereof so that the time-delay mechanism is released.

In a currently preferred embodiment of the present invention, there is provided an actuating arrangement for pivoting the coupling component into the second position thereof, while determining the period of time after which the coupling component is pivoted into the first position thereof in which it disengages from the operating member. In order to obtain a very flat construction, it is advantageous according to a further feature of the present invention to construct the actuating element as a sliding member which cooperates with an additional sliding member. It is further advantageous if the additional sliding member is provided with a projection which cooperates with an inclined surface provided on the coupling component so that the angular position of the latter can be determined by the position of the actuating element, and when the projection of the additional sliding member causes displacement of the coupling component into its inactive first position either as the result of manually operating the actuating element, or as a result of the action of the time-delay mechanism. It is further proposed that a spring-biased lever be provided which has portions extending into the path of movement of the time-delay mechanism, on the one hand, and of the additional sliding member, on the other hand, when the pivotably and displaceably mounted coupling component assumes its second position in which it engages the operating member of the shutter, and that the lever be displaced out of the path of movement of the additional sliding member due to the action of the advancing time-delay mechanism. In order to be able to select whether the camera it is to be used with or without the time-delay feature, it is advantageous when an inclined surface is provided on the sliding member which cooperates with the lever in such a manner that the latter is moved out of the path of movement of the time-delay mechanism and of the additional sliding member when the actuating element including the sliding member is moved from its position assumed when the time-delay mechanism is to be used into another position assumed when the time-delay mechanism is not to be used.

The time-delay mechanism may include a train of gears and an intermittent detent arrangement, which results in a particularly flat and space-saving construction of the time-delay mechanism. Such essentially flat timing mechanisms are already known and in widespread use so that no additional explanation of this mechanism is deemed necessary. The problem encountered in the prior art cameras, though, was not the amount of space taken up by the time-delay mechanism itself, but rather the amount of space assumed by the control mechanism for activating and deactivating the timing device, such as mounting the various components on tiltable plates and the like. In addition thereto, the prior art constructions are very complex and thus expensive. On the other hand, the present invention avoids these problems by constructing the control means for activating and deactivating the time-delay mechanism predominantly as sliding members which themselves are rather flat but can also be so arranged in space that the entire control mechanism is rather flat and has a substantial dimension only in the directions of movements of the sliding members. Thus, such a coupling or control mechanism can be used in so-called "pocket cameras" where the available space is at a premium, without having to increase the dimensions of the camera in order to accommodate the time-delay and coupling mechanisms therein. Thus, for instance, both the time-delay and the coupling mechanisms may be accommodated in the available space between the compartment for accommodating the film cartridge and the housing of the camera.

The novel features which are considered as characteristic for the invention are set forth in particular in the appended claims. The invention itself, however, both as to its construction and its method of operation, together with addtitional objects and advantages thereof, will be best understood from the following description of specific embodiments when read in connection with the accompanying drawing.

BRIEF DESCRIPTION OF THE DRAWING

The sole FIGURE is a partially exploded fragmenatry perspective view of an embodiment of the present invention in which those parts of the camera which are not necessary for understanding the present invention have been omitted.

DESCRIPTION OF THE PREFERRED EMBODIMENTS

Referring now to the sole FIGURE of the drawing, it may be seen that only those parts of the camera proper which are necessary for understanding the present nvention and its orientation with respect to and cooperation with the camera have been illustrated therein. The reference numeral 1 has been used to designate a camera housing of which only part of the upper wall is shown in the drawing. Two plates 1a and 1b are stationarily mounted in the housing 1, and a shutter opening 2 is diagrammatically indicated in phantom lines. A release button 3 is mounted in the shown part of the upper wall of the camera housing 1, and a film cartridge C which is accommodated in the camera housing 1 in alignment with the shutter opening 2 is also indicated in phantom lines. The shutter setting and releasing mechanism of the camera is of a conventional construction so that only two displacement members 4 and 5, each respectively carrying a pin 4a and a pin 5a which respectively engage non-illustrated shutter sectors, have been shown. Each of the displacement members 4 and 5 is mounted for rotation about an only indicated axis 1c or 1d, respectively and is acted upon by a respective tension spring 6 or 7. Cam followers 4b and 5b are mounted on the displacement members 4 and 5, the action of the tension springs 6 and 7 urging the same into engagement with a respective cam surface 8a or 8b of an operating member 8 which is constructed as a setting and releasing slide. The setting and releasing slide 8 is provided with an arm 8c, and the release button is operatively connected with a release lever 9 which is formed with a locking shoulder 9a which cooperates with the arm 8c of the slide 8 to lock the latter when displaced to the greatest extent toward the right as illustrated in the drawing. When the release button 3 is depressed, the release lever 9 is rotated in the counterclockwise direction so that the locking shoulder 9a disengages from the arm 8c so that the slide 8 can now move in the direction indicated by an arrow 10. During such movement of the slide 8, the displacement members 4 and 5 can rotate in clockwise direction in dependency on an electronic or mechanical control so that the non-illustated shutter sectors can open. The displacement members 4 and 5 cooperate in such a manner that first one of the shutter sections which is associated with the displacement member 4 uncovers the shutter opening 2, and subsequently the other shutter sector associated with the displacement member 5 covers the shutter opening 2. When the shutter setting and releasing mechanism is to be readied for taking a picture, this can be accomplished by conventional means (not shown) which is arranged between a toothed advancing rack 11 and the setting and releasing slide 8 which moves the latter in a direction opposite to that indicated by the arrow 10 so that the arm 8c engages behind the locking shoulder 9a of the release lever 9 and is held in this position until the release button 3 is depressed again. When the release button 3 is again depressed, then the release lever 9 again tilts in the counterclockwise direction, thus freeing the setting and releasing slide 8 for movement in the direction of the arrow 10 under the influence of the tension spring 6 and 7 which act on the displacement members 4 and 5.

The above-discussed shutter setting and releasing mechanism is already known as to its basic construction and operation and has been described only to disclose the environment in which the present invention is used. It is desired, according to the present invention that a time-delay mechanism be provided for controlling the action of the shutter. The time-delay mechanism includes a per se known timing gear drive 12 which is mounted on a plate 1a for rotation about an axis 32. A one-way clutch 13, 14 connects the timing gear drive 12 with a tensioning disc 15. A tang 15a mounted on the tensioning disc 15 extends in a slot 16a of part-circular configuration, the slot 16a being formed in a toothed segment 16 which is mounted coaxially with the tensioning disc 15. The toothed segment 16 meshes with a gear wheel 17 which, in turn, meshes with the toothed advancing rack 11. The toothed advancing rack 11 reciprocates during the advancement of the film in the cartridge C, so that the toothed wheel 17 and the toothed segment 16 are angularly displaced in opposite directions about their axes of rotation. Now, when the toothed segment 16 is angularly displaced in the direction opposite to the clockwise direction, then a rear abutment surface 16b delimiting the slot 16a engages the tang 15a and thus displaces the tensioning disc 15 into the position which is illustrated in the drawing. The intermittent detent gear drive 12 is inactive in this position, but is ready for use. When the toothed segment 16 is again displaced, the latter moves relative to the stationary tang 15a so that, practically, the slot 16 moves relative to the tang 15a. When the time-delay mechanism is energized as will be explained later on, a spring 18 causes the time-delay mechanism 12 to rotate about the axis 32, the one-way clutch 13, 14 having fins 14a on the member 14 which engage into recesses 13a on the member 13, transmits the rotary motion of the time-delay mechanism 12 to the tensioning disc 15 so that the latter rotates in the clockwise direction until the tang 15a is again located at the rear abutment surface 15b of the slot 16a. Thus, when the time-delay mechanism 12 is readied for use, only the toothed segment 16a and the tensioning disc 15 are rotated in a counterclockwise direction, while the time-delay mechanism 12 rotates the tensioning disc 15 in the clockwise direction when released without causing any rotation of the toothed segment 16.

The tensioning disc 15 is formed with two contact portions 15b and 15c. When the time-delay mechanism 12 is ready for use, a locking lever 19 acted upon by a spring 20 is located frontwardly of and in contact with the contact portion 15b of the tensioning disc 15. A rotatable and shiftable coupling component 21 is formed with a cutout 21a into which an end of the locking lever 19 extends. The component 21 is mounted in the camera housing 1 for, on the one hand, pivoting about a shaft 22 opposite to the action of a spring 23 as indicated by an arrow 24 and, on the other hand, for displacement in the direction of an arrow 25, the component 21 being provided, for this purpose, with a slot 21b in which a pivot 1e stationarily mounted in the housing 1 is received. The coupling component 21 has one end portion 21c which, when the time-delay mechanism has been activated, extends into the path of movement of the operating member 8 and, more particularly, engages a lug 8e thereof, while during the rotation of the coupling component 21 in the direction of the arrow 24, which ensues when the time-delay mechanism 12 is not to be used, the end portion 21c does not interfere with free movement of the lug 8e of the operating member 8.

A lever 26 mounted on an axle 27 for rotation thereabout has a nose 26a which is located in the path of movement of the contact portion 15c of the tension plate 15. A tag 26b is provided on the lever 26. Two sliding elements 28 and 29 each of which is provided with an elongated slot 28a and 29a, are mounted on the plate 1b for sliding movement relative thereto and also with respect to one another, being guided by means of the slots 28a, 29a. The lower sliding element 28 has a projection 28b which has an inclined surface which extends into the region of an inclined end portion 21d of the component 21. In addition thereto, a tongue 28c of the sliding element 28 extends into a slot 29b of the sliding elements 29. A spring 30 is connected to and extends between the sliding element 28 and the lever 26 and connects the same with one another and pulls them in direction toward each other. An actuating element 29c is formed on the sliding element 29 and is accessible from the exterior of the housing. The sliding element 29 further has an inclined surface 29d, and the sliding element 28 is formed with a contact face 28d.

Having so described the construction of the device according to the present invention, the operation thereof will now be discussed.

When it is desired not to use the ready-for-use time-delay mechanism 12, then the actuating element 29c is shifted in the direction of an arrow 31. During this movement, the inclined surface 29d cooperates with the peg 26b so as to dispense the same in a direction in which the lever 26 is rotated in the counterclockwise direction out of the path of movement of the contact portion 15c. Simultaneously, the peg 26b also disengages from the contact face 28d so that the sliding element 28 shifts under the influence of the spring 30 in the direction of the arrow 31. As a result thereof, the projection 28b presses against the inclined end portion 21d of the coupling component 21, thus rotating or pivoting the component 21 in the direction of the arrow 24. In this manner, the end portion 21c is moved to a position in which it is located outside the path of movement of the operating member 8. When the release button is actuated or depressed uner these conditions, the operating member 8 displaces relative to the housing in the manner which has been discussed previously so that the shutter opening is immediately opened and again closed.

When the camera is to be used utilizing the time-delay feature thereof, then the actuating element 29c is displaced against the direction of the arrow 31 into the position which is illustrated in the sole FIGURE. When the sliding member 29 is displaced in this manner, the downstream edge of the slot 29b abuts against the tongue 28c and thus displaces the same, together with the sliding member 28, against the direction of the arrow 31. As a result of this, the projection 28b slides to the outermost margin of the inclined surface of the end portion 21d so that the coupling component 21 is free to rotate to a certain small extent in the counterclockwise direction. In this manner, the end portion 21c is moved into the path of movement of the lug 8e of the operating member 8 as shown in the sole FIGURE. Simultaneously, however, the lever 26 has been rotated into the illustrated position under the influence of the spring 30 so that the peg 26b is located in front of the contact face 28d.

When the release button 3 is depressed under these circumstances, it is true that the locking shoulder 9a disengages from the arm 8c so that the operating member 8 is free to move in the direction of the arrow 10. However, the operating member 8 can move only to a small extent in the direction of the arrow 10, that is, into the position which is illustrated in the drawing. Upon such a displacement, the lug 8e of the slide 8 abuts against the end portion 21c of the coupling component 21. When the slide 8 has reached this position, the shutter has not yet been opened. The springs 6 and 7 which act on the displacement members 4 and 5 also act on the operating member 8 and via the same on the coupling component 21 so that both are displaced in the direction of the arrow 24, which results in rotation of the arresting member 19, which is partly received in the cutout 21a, in counterclockwise direction. This movement of the arresting member 19 releases the tensioning plate 15 and thus the time-delay mechanism 12 so that the latter can start its rotation about the axis 32.

Due to the fact that the right-hand end of the slot 21b abuts against the pivot 1e,, the coupling component 21 cannot be further displaced in the direction of the arrow 25 so that the displacing members 4 and 5 are prevented from opening and closing the shutter opening 2. As the time-delay mechanism 12 and the tensioning plate rotating therewith conduct the timing movements, the contact portion 15c of the tensioning plate 15 eventually abuts against the nose 26a of the lever 26 so that the latter is rotated in counterclockwise direction as the time-delay mechanism 12 and the tensioning plate 15 conduit the further movement so that finally the contact face 28d is set free from the peg 26b so that the sliding member 28 can move. At this time, the spring 30 displaces both sliding members 28 and 29 in the direction of the arrow 31 so that the projection 28b acts upon the inclined surface of the end portion 21d of the coupling component 21 and displaces the latter in the direction of the arrow 24 so that the end portion 21c of the coupling component 21 disengages from the lug 8e of the operating member 8. Upon such disengagement, the operating slide 8 can move to its leftward position as seen in the drawings by a distance determined by the length of the slot 8f, so that the shutter can be opened and closed again after a predetermined exposure time in a manner which is already known. Inasmuch as the coupling component 21, upon disengagement from the lug 8e, is no longer acted upon in the direction of the arrow 25, it is possible for it to return, under the action of the spring 20 in its rest position contrary to the direction of the arrow 25. In this manner, the arresting lever 19 reassumes its arresting position.

In a following resetting operation, the operating slide 8 is moved opposite to the direction of the arrow 10, and the toothed gear wheel 17 is rotated in the clockwise direction. This results in a rotation of the toothed segment 16 so that the tensioning disc 15 and a part 14 of the one-way coupling are rotated so that the spring 18 is tensioned by the central shaft 32 while the one-way coupling 13a, 14a disengages the time-delay mechanism 12 from the tensioning plate 15. Subsequently to tensioning of the spring 18, the tensioning disc 15 is held in its tensioned position by the arresting lever 19. The camera is now ready for taking of a further picture either with or without the time-delay feature depending on the position of the actuating element 29c.

It will be appreciated that the arrangement of the present invention can also be used in connection with an automatic shutter assembly and where the slide 8 is a shutter driving element which is tensioned only after the depression of the release button 3.

It will be understood that each of the elements described above, or two or more together, may also find a useful application in other types of constructions differing from the types described above.

While the invention has been illustrated and described as embodied in a small-size camera time-delay arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera of the type having a shutter and a shutter setting and releasing mechanism including an operating member which moves in a predetermined path and direction when released, a combination comprising a time-delay mechanism for the shutter; an arresting member operative for arresting said time-delay mechanism when in an arresting position thereof; a coupling component having one portion adapted to engage said arresting member, another portion adapted for selective cooperation with the operating member, and a further portion formed with an inclined surface, said coupling component being mounted in the camera for pivoting between a first position in which said other portion is located outside said path, and a second position in which said other portion extends into said path to thereby limit the extent of movement of the operating member, and in which said one portion engages said arresting member, said coupling component being also mounted for displacement with the operating member in the direction of movement of the latter when in said second position whereby said one portion of said coupling component displaces said arresting member out of said arresting position so that said time-delay mechanism is released; and means for pivoting said coupling component between said first and second positions, including an actuating element accessible from the exterior of the camera, a first sliding element connected to said actuating element, and a second sliding element operatively connected with said first sliding element for movement toward an extended position and having a projection which engages said inclined surface of said further portion of said coupling component during the movement of said second sliding element toward said extended position thereof, said time-delay mechanism being operative for releasing said second sliding element for movement toward said extended position a predetermined period of time after actuation of the shutter setting and releasing mechanism to thereby pivot said coupling component toward said first position thereof in which it releases the operating member of the shutter setting and releasing mechanism for movement in said predetermined path and direction.

2. A combination as defined in claim 1; and further including a spring-biased lever which has portions extending into the paths of movement of said time-delay mechanism and of said second sliding element when said coupling component is in said second position thereof; and wherein said time-delay mechanism so cooperates with said lever as to move it out of said path of movement of said second sliding element to thereby release the same.

3. A combination as defined in claim 1, wherein said first sliding element has a sloped surface which contacts one of said portions of said lever when said first sliding element is displaced toward an extended position thereof to thereby displace said lever out of the respective paths of movement of said time-delay mechanism and said second sliding element.

4. In a photographic camera of the type having a shutter and a shutter setting and releasing mechanism including an operating member mounted in the camera for translation in a straight path and in a predetermined direction upon release, a combination comprising an elongated coupling element having a first, second and third portion longitudinally spaced from one another, the latter having an inclined surface; means for mounting said coupling component in the camera for pivoting between a first and a second position in which said first portion is located without and within said path, respectively, and also for limited joint translation with the operating member upon engagement of said first portion with the latter in said second position of said coupling component; a time-delay mechanism; an arresting member mounted in the camera for movement between an arresting and a releasing position in which it arrests and releases said time-delay mechanism, respectively, and engaged by said second portion of said coupling component for movement therewith toward said releasing position during said limited joint translation thereof; and means for pivoting said coupling component between said positions thereof, including at least one sliding member mounted in the camera for displacement between a retracted and an extended position upon release by said time-delay mechanism and having a projection which engages said inclined surface of said third portion during the displacement of said sliding member toward said extended position thereof to pivot said coupling component toward said first position, and an actuating element accessible from the exterior of the camera and operatively connected to said sliding member for displacing the same between said positions thereof.

5. A combination as defined in claim 4, and wherein said time-delay mechanism is operative for releasing said slidng member a predetermined period of time after actuating of the setting and releasing mechanism.

6. A combination as defined in claim 4, wherein said time-delay mechanism includes a tensioning assembly, a transmission assembly, and a one-way coupling which is active for connecting said assemblies of said time-delay mechanism only in the active direction of said time-delay mechanism.

* * * * *